(12) United States Patent
Nair et al.

(10) Patent No.: US 9,145,469 B2
(45) Date of Patent: *Sep. 29, 2015

(54) AROMATIC POLYESTER CONTAINING A BIPHENYL CHAIN DISRUPTOR

(71) Applicant: Ticona LLC, Florence, KY (US)

(72) Inventors: Kamlesh P. Nair, Florence, KY (US); Young Shin Kim, Erlanger, KY (US); James P. Shepherd, Independence, KY (US); Prabuddha Bansal, Florence, KY (US)

(73) Assignee: Ticona LLC, Florence, KY (US)

( * ) Notice: Subject to any disclaimer, the term of this patent is extended or adjusted under 35 U.S.C. 154(b) by 100 days.

This patent is subject to a terminal disclaimer.

(21) Appl. No.: 14/027,284

(22) Filed: Sep. 16, 2013

(65) Prior Publication Data

US 2014/0087165 A1  Mar. 27, 2014

Related U.S. Application Data

(60) Provisional application No. 61/706,268, filed on Sep. 27, 2012, provisional application No. 61/740,016, filed on Dec. 20, 2012, provisional application No. 61/786,826, filed on Mar. 15, 2013.

(51) Int. Cl.

| | | |
|---|---|---|
| *C08G 63/02* | (2006.01) | |
| *C08G 63/688* | (2006.01) | |
| *C09D 167/04* | (2006.01) | |
| *B32B 27/36* | (2006.01) | |
| *C08G 63/60* | (2006.01) | |
| *C09D 167/00* | (2006.01) | |
| *C08G 63/00* | (2006.01) | |

(52) U.S. Cl.
CPC ............ *C08G 63/6882* (2013.01); *B32B 27/36* (2013.01); *C08G 63/605* (2013.01); *C08G 63/688* (2013.01); *C09D 167/00* (2013.01); *C09D 167/04* (2013.01); *Y10T 428/269* (2015.01); *Y10T 428/2982* (2015.01)

(58) Field of Classification Search
USPC ................................. 528/271, 272
See application file for complete search history.

(56) References Cited

U.S. PATENT DOCUMENTS

| | | |
|---|---|---|
| 3,953,566 A | 4/1976 | Gore |
| 3,962,153 A | 6/1976 | Gore |
| 4,096,227 A | 6/1978 | Gore |
| 4,161,470 A | 7/1979 | Calundann |
| 4,187,390 A | 2/1980 | Gore |
| 4,394,498 A | 7/1983 | Kastelic |
| 4,619,975 A | 10/1986 | Matzner et al. |
| 4,738,880 A | 4/1988 | Asada et al. |
| 4,772,509 A | 9/1988 | Komada et al. |
| 4,797,465 A | 1/1989 | Portugall et al. |
| 4,902,423 A | 2/1990 | Bacino |
| 4,916,017 A | 4/1990 | Nomi et al. |
| 4,985,296 A | 1/1991 | Mortimer, Jr. |
| 5,278,254 A | 1/1994 | Furuta et al. |
| 5,476,589 A | 12/1995 | Bacino |
| 5,545,475 A | 8/1996 | Korleski |
| 5,616,680 A | 4/1997 | Linstid, III |
| 5,759,674 A | 6/1998 | Furuta et al. |
| 5,767,223 A | 6/1998 | Yamada et al. |
| 5,814,405 A | 9/1998 | Branca et al. |
| 5,847,039 A | 12/1998 | Nagashima et al. |
| 5,856,572 A | 1/1999 | Liou et al. |
| 5,891,532 A | 4/1999 | Furuta et al. |
| 5,900,292 A | 5/1999 | Moriya |
| 6,001,302 A | 12/1999 | Moriya |
| 6,093,636 A | 7/2000 | Carter et al. |
| 6,114,492 A | 9/2000 | Linstid, III et al. |
| 6,121,495 A | 9/2000 | Babb et al. |
| 6,177,500 B1 | 1/2001 | Okamoto et al. |
| 6,265,753 B1 | 7/2001 | Carter et al. |
| 6,376,076 B1 | 4/2002 | Ohbe et al. |
| 6,403,211 B1 | 6/2002 | Yang et al. |
| 6,433,071 B1 | 8/2002 | Arai et al. |
| 6,512,079 B2 | 1/2003 | Okamoto et al. |
| 6,514,611 B1 | 2/2003 | Shepherd et al. |

(Continued)

FOREIGN PATENT DOCUMENTS

| | | |
|---|---|---|
| EP | 0 196 528 A2 | 3/1986 |
| EP | 0 196 528 A3 | 3/1986 |

(Continued)

OTHER PUBLICATIONS

Abstract of Japanese Patent, JPS6264832, Mar. 23, 1987, 1 page.
Abstract of Japanese Patent—JPH11181284, Jul. 6 1999, 2 pages.
Abstract of Japanese Patent—JP2004250688, Sep. 9, 2004, 2 pages.
Abstract of Japanese Patent—JP2004319929, Nov. 11, 2004, 2 pages.
Abstract of Japanese Patent—JP2005305734, Nov. 4, 2005, 2 pages.
Abstract of Japanese Patent—JP2005342980, Dec. 15, 2005, 1 page.
Abstract of Japanese Patent—JP2006117731, May 11, 2006, 1 page.
Abstract of Japanese Patent—JP2006137786, Jun. 1, 2006, 2 pages.
Abstract of Japanese Patent—JP2006176564, Jul. 6, 2006, 1 page.
Abstract of Japanese Patent—JP2006188570, Jul. 20, 2006, 1 page.
Abstract of Japanese Patent—JP2006193604, Jul. 27, 2006, 1 page.
Abstract of Japanese Patent—JP2006335813, Dec. 14, 2006, 2 pages.

(Continued)

*Primary Examiner* — Terressa Boykin
(74) *Attorney, Agent, or Firm* — Dority & Manning, P.A.

(57) ABSTRACT

An aromatic polyester that contains one or more aromatic ester repeating units and one or more biphenyl repeating units is provided. While a wide variety of aromatic ester repeating units may be employed, the polymer is nevertheless "low naphthenic" to the extent that it contains a minimal content of repeating units derived from naphthenic hydroxycarboxylic acids and naphthenic dicarboxylic acids. Despite the absence of a high level of conventional naphthenic acid repeating units, the present inventors have discovered that selective control over the type and relative concentration of the biphenyl repeating units can lead to "low naphthenic" polymers that are not only soluble in certain solvents, but also capable of exhibiting good mechanical properties. Thus, the ability of the resulting polymer to be dissolved or dispersed in various solvents can be enhanced without sacrificing performance.

20 Claims, 7 Drawing Sheets

(56) References Cited

U.S. PATENT DOCUMENTS

| | | |
|---|---|---|
| 6,528,164 B1 | 3/2003 | Ohbe et al. |
| 6,538,211 B2 | 3/2003 | St. Lawrence et al. |
| 6,579,954 B1 | 6/2003 | Nagashima et al. |
| 6,602,583 B2 | 8/2003 | St. Lawrence et al. |
| 6,605,324 B1 | 8/2003 | Machida et al. |
| 6,616,796 B1 | 9/2003 | Onodera et al. |
| 6,649,730 B2 | 11/2003 | Okamoto et al. |
| 6,696,163 B2 | 2/2004 | Yang |
| 6,761,834 B2 | 7/2004 | St. Lawrence et al. |
| 6,797,345 B2 | 9/2004 | Okamoto et al. |
| 6,838,546 B2 | 1/2005 | Okamoto et al. |
| 6,867,280 B2 | 3/2005 | Okamoto et al. |
| 6,890,988 B2 | 5/2005 | Hosoda et al. |
| 6,923,919 B2 | 8/2005 | Yang et al. |
| 6,994,896 B2 | 2/2006 | Sethumadhavan et al. |
| 7,009,026 B2 | 3/2006 | Okamoto et al. |
| 7,014,921 B2 | 3/2006 | Okamoto et al. |
| 7,022,413 B2 | 4/2006 | Katagiri et al. |
| 7,022,807 B2 | 4/2006 | Okamoto et al. |
| 7,052,574 B2 | 5/2006 | Onodera et al. |
| 7,063,892 B2 | 6/2006 | Okamoto et al. |
| 7,087,704 B2 | 8/2006 | Kanaka et al. |
| 7,094,359 B2 | 8/2006 | Okamoto et al. |
| 7,132,152 B2 | 11/2006 | Prasad |
| 7,179,401 B2 | 2/2007 | Ueno et al. |
| 7,193,020 B2 | 3/2007 | Ito et al. |
| 7,211,527 B2 | 5/2007 | Okamoto et al. |
| 7,211,528 B2 | 5/2007 | Katagiri et al. |
| 7,227,179 B2 | 6/2007 | St. Lawrence et al. |
| 7,244,807 B2 | 7/2007 | Ohtomo et al. |
| 7,304,121 B2 | 12/2007 | Kato et al. |
| 7,306,729 B2 | 12/2007 | Bacino et al. |
| 7,344,657 B2 | 3/2008 | Okamoto et al. |
| 7,550,093 B2 | 6/2009 | Seo et al. |
| 7,560,005 B2 | 7/2009 | Lee et al. |
| 7,727,179 B2 | 6/2010 | Barrett |
| 7,766,561 B1 | 8/2010 | Mahapatra et al. |
| 7,816,014 B2 | 10/2010 | Ito et al. |
| 7,862,745 B2 | 1/2011 | Tano et al. |
| 7,883,780 B2 | 2/2011 | Okamoto et al. |
| 7,887,887 B2 | 2/2011 | Cho et al. |
| 8,101,248 B2 | 1/2012 | Yun et al. |
| 8,168,082 B2 | 5/2012 | Matsuda et al. |
| 8,178,646 B2 | 5/2012 | Kohinata et al. |
| 8,465,670 B2 | 6/2013 | Kondo et al. |
| 8,585,923 B2 | 11/2013 | Yonezawa et al. |
| 8,623,449 B2 | 1/2014 | Ito et al. |
| 2002/0081443 A1 | 6/2002 | Connelly et al. |
| 2003/0207048 A1 | 11/2003 | St. Lawrence et al. |
| 2004/0058137 A1 | 3/2004 | Okamoto et al. |
| 2004/0091686 A1 | 5/2004 | Okamoto et al. |
| 2004/0135118 A1 | 7/2004 | Waggoner |
| 2004/0192858 A1 | 9/2004 | Katagiri et al. |
| 2007/0122637 A1 | 5/2007 | Okamoto et al. |
| 2007/0293633 A1 | 12/2007 | Hosoda et al. |
| 2008/0048150 A1 | 2/2008 | Hosoda et al. |
| 2009/0229750 A1 | 9/2009 | Ito et al. |
| 2009/0298295 A1 | 12/2009 | Kikuyama et al. |
| 2009/0324929 A1 | 12/2009 | Yamakawa et al. |
| 2010/0009067 A1 | 1/2010 | Inoue et al. |
| 2010/0203326 A1 | 8/2010 | Ok |
| 2010/0236820 A1 | 9/2010 | Suh |
| 2011/0014434 A1 | 1/2011 | Tanaka et al. |
| 2011/0229629 A1 | 9/2011 | Ito et al. |
| 2012/0085570 A1 | 4/2012 | Kim et al. |
| 2012/0107510 A1 | 5/2012 | Ito et al. |
| 2012/0135218 A1 | 5/2012 | Shim et al. |
| 2012/0161357 A1 | 6/2012 | Miyakoshi et al. |
| 2012/0164316 A1 | 6/2012 | Kondo et al. |
| 2012/0164447 A1 | 6/2012 | Kohinata |
| 2012/0183697 A1 | 7/2012 | Ito et al. |
| 2012/0193129 A1 | 8/2012 | Ito et al. |
| 2012/0193131 A1 | 8/2012 | Kusakawa et al. |
| 2012/0196043 A1 | 8/2012 | Azami |
| 2012/0196044 A1 | 8/2012 | Azami |
| 2012/0199999 A1 | 8/2012 | Shim et al. |
| 2012/0248375 A1 | 10/2012 | Uehara |
| 2012/0263882 A1 | 10/2012 | Okamoto et al. |
| 2012/0325534 A1 | 12/2012 | Ito et al. |
| 2012/0328872 A1 | 12/2012 | Ito et al. |
| 2013/0037313 A1 | 2/2013 | Miyakoshi et al. |
| 2013/0052336 A1 | 2/2013 | Miyakoshi et al. |
| 2013/0099149 A1 | 4/2013 | Ji et al. |
| 2013/0101824 A1 | 4/2013 | Shim et al. |
| 2014/0087086 A1* | 3/2014 | Nair et al. ............ 427/447 |
| 2014/0087149 A1 | 3/2014 | Nair et al. |

FOREIGN PATENT DOCUMENTS

| | | |
|---|---|---|
| EP | 0 248 617 A2 | 12/1987 |
| EP | 0 248 617 A3 | 12/1987 |
| EP | 1 178 072 A2 | 2/2002 |
| EP | 1 178 072 A3 | 2/2002 |
| WO | WO 9702309 A1 | 1/1997 |
| WO | WO 2004058851 A1 | 7/2004 |

OTHER PUBLICATIONS

Abstract of Japanese Patent—JP2009280831, Dec. 3, 2009, 1 page.
Abstract of Japanese Patent—JP2010121025, Jun. 3, 2010, 1 page.
Abstract of Japanese Patent—JP201157420, Aug. 18, 2011, 1 page.
Abstract of Japanese Patent—JP2012012467, Jan. 19, 2012, 1 page.
Abstract of WO Patent—WO2012118262, Oct. 26, 2012, 1 page.
Abstract of WO Patent—WO2012153901, Nov. 15, 2012, 1 page.
*A Guidebook to particle Size Analysis* from Horiba Scientific, 2010, 17 pages.
Article—Chen et al., "Design and Development of a Packaging Using LCP for RF/Microwave MEMS Switches," *IEEE Transaction on Microwave Theory and Techniques*, vol. 54, No. 11, Nov. 2006, pp. 4009-4015.
Article—Markus Wille, "Basic Designs Of Flex-Rigid Printed Circuit Boards," www.Onboard-Technology.com, *OnBoard Technology*, Jun. 2006, pp. 8-13.
Article—Tom Woznicki, "Films and Adhesives—So Many Choices," *Flex Circuit News*, Aug. 2001, pp. 1-8.
Article—Wang et al., "Liquid crystal polymer (LCP) for MEMS: processes and applications," *J. Micromech. Microeng.*, vol. 13, 2003, pp. 628-633.
Paper—Dr. Terry F. Hayden, "New Liquid Crystal Polymer (LCP) Flex Circuits to Meet Demanding Reliability and End-Use Applications Requirements," *3M Microelectroncis Systems Division*, 7 pages.
Paper—Mahapatra et al., "Low Cost, Hermetic Optical Port Using Liquid Crystal Polymer," Presented at Optoelectronics Device Packaging and Materials Topical Workshop, IMAPS, Bethlehem, PA, 2003, 6 pages.
Paper—Okamoto et al., "Newly Developed LCP Film Fabricated by Solvent-Coating Method," *Sumitomo Kagaku*, vol. 2005-I, 2005, 11 pages.
Paper—R. Lusignea, "High Barrier Packaging with Liquid Crystal Polymers," *1996 Polymers, Laminations & Coatings Conference*, TAPPI Proceedings, 1996, pp. 115-124.
Paper—Rich Trine, "Multilayer Lamination Methods for PTFE-Based PCBs," *Taconic*, 2007, 11 pages.
Paper—Sood et al., "Controlling Moisture in Printed Circuit Boards," *IPC Printed Circuit Expo, APEX & Designer Summit Proceedings*, 2011, 10 pages.
Presentation—Proposal to Flexible PCB Materials, Jun. 2008, Matsushita Electric Works, Ltd.
Processing Guidelines for Speedboard® C Prepreg from W.L. Gore & Associates, Inc., 2007, 2 pages.
Product Information on Gore® Speedboard® C Prepreg from W.L. Gore & Associates, Inc., 2012, 1 page.
Product Information on YFLEX Flexible Circuit Board from Yamaichi Electronics, Jan. 2006, 4 pages.
Related U.S. Patent Application Form.
Abstract of European Patent—EP0226847, Aug. 23, 1989, 2 pages.
Search Report and Written Opinion for PCT/US2013/059851, Jun. 5, 2014.

* cited by examiner

AROMATIC POLYESTER CONTAINING A BIPHENYL CHAIN DISRUPTOR

RELATED APPLICATIONS

The present application claims priority to U.S. Provisional Application Ser. Nos. 61/706,268 (filed on Sep. 27, 2012); 61/740,016 (filed on Dec. 20, 2012); and 61/786,826 (filed on Mar. 15, 2013), which are incorporated herein in their entirety by reference thereto.

BACKGROUND OF THE INVENTION

Flexible printed circuit boards are increasingly being used in high density, small electronic components. Such circuit boards are typically produced from a "copper clad laminate" that contains a copper foil and an insulating film. However, the laminate often curls during heat treatment due to the relatively poor heat resistance of the polymers used to form the film. In this regard, liquid crystalline polyesters have been suggested for use in forming the insulating film due to their relatively high degree of heat resistance. Nevertheless, one of the problems in successfully incorporating these types of polymers into flexible printed circuit boards is that they are not soluble in most solvents, and thus cannot be readily cast into a film. Various attempts have been made to solve this problem. For example, one liquid crystalline polyester that has been proposed for producing films is formed from 2-hydroxy-6-naphthoic acid ("HNA"), 2,6-naphthanlenedicarboxylic acid ("NDA"), and 4,4'-dihydroxydiphenyl ether. While allegedly having improved solubility, the polyester requires a very high amount of naphthenic monomers to achieve sufficient liquid crystallinity and mechanical strength. Unfortunately, the high cost of naphthenic acid monomers dictates that the need for others solutions to the problems noted.

As such, a need exists for a polymer that contains a low naphthenic content, but yet is still capable of possessing a sufficient degree of solubility in various solvents to that it can be readily formed into a film.

SUMMARY OF THE INVENTION

In accordance with one embodiment of the present invention, an aromatic polyester is disclosed that comprises:

i) from about 5 mol. % to about 50 mol. % of aromatic biphenyl repeating units having the following general Formula I:

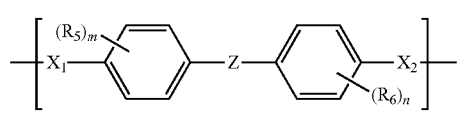

(I)

wherein, $R_5$ and $R_6$ are independently halo, haloalkyl, alkyl, alkenyl, aryl, heteroaryl, cycloalkyl, or heterocyclyl;

m and n are independently from 0 to 4;

$X_1$ and $X_2$ are independently O, C(O), NH, C(O)HN, or NHC(O); and

Z is O or $SO_2$;

ii) from about 1 mol. % to about 70 mol. % of aromatic hydroxycarboxylic repeating units having the following general Formula II:

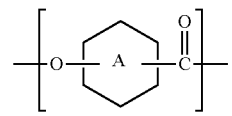

(II)

wherein, ring A is aryl; and iii) from about 5 mol. % to about 60 mol. % of aromatic dicarboxylic acid repeating units having the following general Formula III:

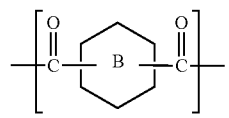

(III)

wherein, ring B is aryl.

The total amount of repeating units in the aromatic polyester derived from naphthenic hydroxycarboxylic acids and/or naphthenic dicarboxylic acids is no more than about 60 mol. %.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
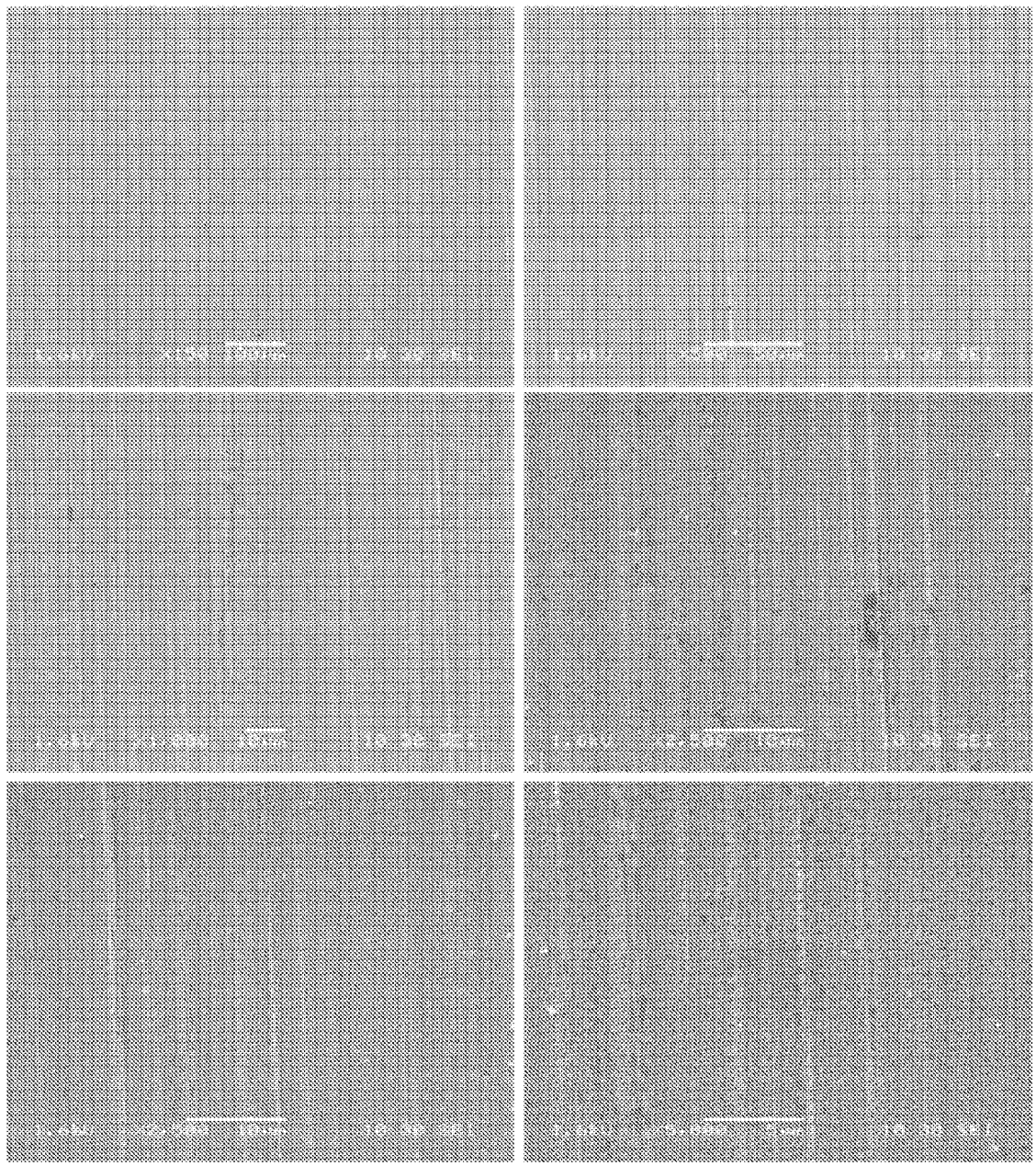
FIG. 1 illustrates SEM microphotographs of the smooth surface of the copper strip used in Example 6, determined at a 1.6 kv voltage and magnifications of 150×, 500×, 1,000×, 2,500×, and 5,000×.

It is to be understood that the terminology used herein is for the purpose of describing particular embodiments only and is not intended to limit the scope of the present invention.

"Alkyl" refers to monovalent saturated aliphatic hydrocarbyl groups having from 1 to 10 carbon atoms and, in some embodiments, from 1 to 6 carbon atoms. "$C_{x-y}$alkyl" refers to alkyl groups having from x to y carbon atoms. This term includes, by way of example, linear and branched hydrocarbyl groups such as methyl ($CH_3$), ethyl ($CH_3CH_2$), n-propyl ($CH_3CH_2CH_2$), isopropyl (($CH_3)_2CH$), n-butyl ($CH_3CH_2CH_2CH_2$), isobutyl (($CH_3)_2CHCH_2$), sec-butyl (($CH_3)(CH_3CH_2)CH$), t-butyl (($CH_3)_3C$), n-pentyl ($CH_3CH_2CH_2CH_2CH_2$), and neopentyl (($CH_3)_3CCH_2$).

"Alkenyl" refers to a linear or branched hydrocarbyl group having from 2 to 10 carbon atoms and in some embodiments from 2 to 6 carbon atoms or 2 to 4 carbon atoms and having at least 1 site of vinyl unsaturation (>C=C<). For example, ($C_x$-$C_y$)alkenyl refers to alkenyl groups having from x to y carbon atoms and is meant to include for example, ethenyl, propenyl, 1,3-butadienyl, and so forth.

"Alkynyl" refers to refers to a linear or branched monovalent hydrocarbon radical containing at least one triple bond. The term "alkynyl" may also include those hydrocarbyl groups having other types of bonds, such as a double bond and a triple bond.

"Aryl" refers to an aromatic group of from 3 to 14 carbon atoms and no ring heteroatoms and having a single ring (e.g., phenyl) or multiple condensed (fused) rings (e.g., naphthyl or anthryl). For multiple ring systems, including fused, bridged, and spiro ring systems having aromatic and non-aromatic rings that have no ring heteroatoms, the term "Aryl" applies when the point of attachment is at an aromatic carbon atom (e.g., 5,6,7,8tetrahydronaphthalene-2-yl is an aryl group as its point of attachment is at the 2-position of the aromatic phenyl ring).

"Cycloalkyl" refers to a saturated or partially saturated cyclic group of from 3 to 14 carbon atoms and no ring heteroatoms and having a single ring or multiple rings including fused, bridged, and spiro ring systems. For multiple ring systems having aromatic and non-aromatic rings that have no ring heteroatoms, the term "cycloalkyl" applies when the point of attachment is at a non-aromatic carbon atom (e.g., 5,6,7,8,-tetrahydronaphthalene-5-yl). The term "cycloalkyl" includes cycloalkenyl groups, such as adamantyl, cyclopropyl, cyclobutyl, cyclopentyl, cyclooctyl, and cyclohexenyl. The term "cycloalkenyl" is sometimes employed to refer to a partially saturated cycloalkyl ring having at least one site of >C=C< ring unsaturation.

"Halo" or "halogen" refers to fluoro, chloro, bromo, and iodo.

"Haloalkyl" refers to substitution of alkyl groups with 1 to 5 or in some embodiments 1 to 3 halo groups.

"Heteroaryl" refers to an aromatic group of from 1 to 14 carbon atoms and 1 to 6 heteroatoms selected from oxygen, nitrogen, and sulfur and includes single ring (e.g., imidazolyl) and multiple ring systems (e.g., benzimidazol-2-yl and benzimidazol-6-yl). For multiple ring systems, including fused, bridged, and Spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquinolin-3-yl). In some embodiments, the nitrogen and/or the sulfur ring atom(s) of the heteroaryl group are optionally oxidized to provide for the N oxide (N→O), sulfinyl, or sulfonyl moieties. Examples of heteroaryl groups include, but are not limited to, pyridyl, furanyl, thienyl, thiazolyl, isothiazolyl, triazoryl, imidazolyl, imidazolinyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl.

"Heterocyclic" or "heterocycle" or "heterocycloalkyl" or "heterocyclyl" refers to a saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic", "heterocycle", "heterocycloalkyl", or "heterocyclyl" apply when there is at least one ring heteroatom and the point of attachment is at an atom of a non-aromatic ring (e.g., decahydroquinolin-6-yl). In some embodiments, the nitrogen and/or sulfur atom(s) of the heterocyclic group are optionally oxidized to provide for the N oxide, sulfinyl, sulfonyl moieties. Examples of heterocyclyl groups include, but are not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl.

It should be understood that the aforementioned definitions encompass unsubstituted groups, as well as groups substituted with one or more other functional groups as is known in the art. For example, an aryl, heteroaryl, cycloalkyl, or heterocyclyl group may be substituted with from 1 to 8, in some embodiments from 1 to 5, in some embodiments from 1 to 3, and in some embodiments, from 1 to 2 substituents selected from alkyl, alkenyl, alkynyl, alkoxy, acyl, acylamino, acyloxy, amino, quaternary amino, amide, imino, amidino, aminocarbonylamino, amidinocarbonylamino, aminothiocarbonyl, aminocarbonylamino, aminothiocarbonylamino, aminocarbonyloxy, aminosulfonyl, aminosulfonyloxy, aminosulfonylamino, aryl, aryloxy, arylthio, azido, carboxyl, carboxyl ester, (carboxyl ester)amino, (carboxyl ester)oxy, cyano, cycloalkyl, cycloalkyloxy, cycloalkylthio, guanidino, halo, haloalkyl, haloalkoxy, hydroxy, hydroxyamino, alkoxyamino, hydrazino, heteroaryl, heteroaryloxy, heteroarylthio, heterocyclyl, heterocyclyloxy, heterocyclylthio, nitro, oxo, oxy, thione, phosphate, phosphonate, phosphinate, phosphoramidate, phosphorodiamidate, phosphoramidate monoester, cyclic phosphoramidate, cyclic phosphorodiamidate, phosphoramidate diester, sulfate, sulfonate, sulfonyl, substituted sulfonyl, sulfonyloxy, thioacyl, thiocyanate, thiol, alkylthio, etc., as well as combinations of such substituents. When incorporated into the polymer of the present invention, such substitutions may be pendant or grafted groups, or may themselves form part of the polymer backbone. For example, in Formula I below, $R_1$ and/or $R_2$ may be a sulfonyl- or oxy-substituted aryl group in that the sulfonyl group (—$SO_2$—) or oxy group (—O—) is contained within the polymer backbone and links together the phenyl group with the aryl substitution.

It is to be understood by one of ordinary skill in the art that the present discussion is a description of exemplary embodiments only, and is not intended as limiting the broader aspects of the present invention.

Generally speaking, the present invention is directed to an aromatic polyester that contains:

i) aromatic biphenyl repeating units of Formula I in an amount of from about 5 mol. % to about 50 mol. %, in some embodiments from about 10 mol. % to about 40 mol. %, and in some embodiments, from about 15 mol. % to about 30 mol. %:

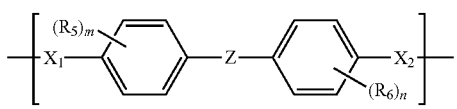

wherein, $R_5$ and $R_6$ are independently halo, haloalkyl, alkyl, alkenyl, aryl, heteroaryl, cycloalkyl, or heterocyclyl;

m and n are independently from 0 to 4, in some embodiments from 0 to 1, and in one particular embodiment, 0;

$X_1$ and $X_2$ are independently O, C(O), NH, C(O)HN, or NHC(O); and

Z is O or $SO_2$;

ii) aromatic hydroxycarboxylic repeating units of Formula II in an amount of from about 1 mol. % to about 70 mol. %, in some embodiments from about 5 ml. % to about 65 mol. %, and in some embodiments, from about 10 mol. % to about 50 mol. %:

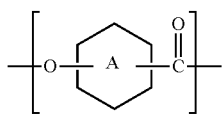

wherein, ring A is aryl (e.g., 1,4-phenylene or 1,3-phenylene); and iii) aromatic dicarboxylic acid repeating units of Formula III in an amount from about 5 mol. % to about 60 mol. %, in some embodiments from about 10 mol. % to about 55 mol. %, and in some embodiments, from about 15 mol. % to about 50 mol. %:

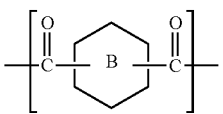

wherein, ring B is aryl (e.g., 1,4-phenylene or 1,3-phenylene).

The copolymer may have any desired copolymer configuration known in the art, such as a block copolymer, grafted copolymer, random copolymer, etc.

In one particular embodiment, m and n are 0 in Formula I such that the biphenyl repeating unit has the following Formula (IV):

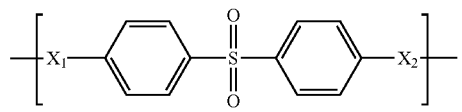

wherein, $X_1$ and $X_2$ are independently O, C(O), NH, C(O)HN, or NHC(O). For example, $X_1$ and/or $X_2$ may be 0 and/or NH.

The repeating units represented in Formula I and/or Formula IV above may be derived from a variety of different biphenyl precursor monomers, including, for example, biphenyl alcohols (e.g., 4-(4-hydroxyphenyl)-sulfonylphenol, 4-(4-aminophenyl)sulfonylphenol, 4-(4-aminophenoxy)phenol, 4-(4-hydroxyphenoxy)-phenol, etc.); biphenyl amines (e.g., 4-(4-aminophenyl)sulfonylaniline, 4-(4-aminophenoxy)aniline, etc.); biphenyl acids (e.g., 4-(4-carboxyphenyl)-sulfonylbenzoic acid, 4-(4-formylphenoxy)benzaldehyde, etc.); biphenyl amides (e.g., 4-(4-carbamoylphenyl)sulfonylbenzamide, N-[4-(4-formamidophenyl)-sulfonylphenyl]formamide, 4-(4-carbamoylphenoxy)benzamide, etc.); and so forth, as well as combinations thereof.

The aromatic hydroxycarboxylic repeating units of Formula II may be derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. One particularly suitable aromatic hydroxycarboxylic acid is 4-hydroxybenzoic acid ("HBA"). The aromatic dicarboxylic repeating units may likewise be derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA") and isophthalic acid ("IA").

While a wide variety of aromatic ester repeating units may be employed, the polymer may nevertheless be "low naphthenic" to the extent that it contains a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than about 60 mol. %, in some embodiments no more than about 50 mol. %, in some embodiments no more than about 35 mol. %, in some embodiments no more than about 30 mmol. %, in some embodiments no more than about 25 mol. %, in some embodiments no more than about 20 mol. %, in some embodiments no more than about 15 mol. %, and in some embodiments, from 0 mol. % to about 10 mol. % of the polymer (e.g., 0 mol. %). Despite the absence of a high level of conventional naphthenic acid repeating units, the present inventors have discovered that selective control over the type and relative concentration of the biphenyl repeating units can lead to "low naphthenic" polymers that are not only soluble in certain solvents, but also capable of exhibiting good mechanical and electrical properties. Without intending to be limited by theory, it is believed that the specific types of biphenyl repeating units noted above can sufficiently disrupt the highly crystalline and linear nature of the polymer backbone without having a significantly adverse impact on other properties of the polymer. Thus, the ability of the resulting polymer to be dissolved or dispersed in various solvents can be enhanced without sacrificing performance.

Of course, other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 25 mol. %, and in some embodiments, from about 5 mol. % to about 20% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids (e.g., cyclohexane dicarboxylic acid), diols, amides, amines, etc. Of course, in other embodiments, the polymer may be "wholly aromatic" in that it lacks repeating units derived from non-aromatic (e.g., aliphatic or cycloaliphatic) monomers.

In one particular embodiment, for example, the aromatic polyester may be formed from repeating units derived from a biphenyl sulfonyl alcohol and/or biphenyl sulfonyl amine (e.g., 4-(4-hydroxyphenyl)sulfonylphenol, or 4-(4-aminophenyl)-sulfonylaniline), 4-hydroxybenzoic acid ("HBA"), and terephthalic acid ("TA") and/or isophthalic acid ("IA"), as well as various other optional constituents. The repeating units derived from the sulfonyl compound may constitute from about 5 mol. % to about 50 mol. %, in some embodiments from about 10 mol. % to about 40 mol. %, and in some embodiments, from about 15 mol. % to about 30 mol. %. The repeating units derived from 4-hydroxybenzoic acid ("HBA") may constitute from about 5 mol. % to about 70 mol. %, in some embodiments from about 10 mol. % to about 65 mol. %, and in some embodiments, from about 15 mol. % to about 50% of the polymer. The repeating units derived from terephthalic acid ("TA") and/or isophthalic acid ("IA") may likewise constitute from about 5 mol. % to about 40 mol. %, in some embodiments from about 10 mol. % to about 35 mol. %, and in some embodiments, from about 15 mol. % to about 35% of the polymer. Other possible repeating units may include those derived from 4,4'-biphenol ("BP"), hydroquinone ("HQ"), and/or acetaminophen ("APAP"). In certain embodiments, for example, repeating units derived from BP, HQ, and/or APAP may each constitute from about 1 mol. % to about 30 mol. %, in some embodiments from about 2 mol. % to about 25 mol. %, and in some embodiments, from about 3 mol. % to about 20 mol. % when employed. If desired, the polymer may also contain a relatively low amount of repeating units derived from naphthenic monomers (6-hydroxy-2-naphthoic acid ("HNA") or 2,6-naphthalenedicarboxylic acid ("NDA") within the ranges noted above.

Although not necessarily a requirement, the resulting aromatic polyester is generally classified as a "thermotropic liquid crystalline" polymer to the extent that it can possess a rod-like structure and exhibit a crystalline behavior in its molten state (e.g., thermotropic nematic state). The polymer may possess a fully crystalline, semi-crystalline, or amorous-like structure under certain circumstances. For example, when dissolved in a solvent, the polymer may exhibit amorphous-like properties in that it becomes transparent and lacks an identifiable melting point. Yet, after heat treatment and solvent removal, the polymer may exhibit a highly-ordered crystalline structure in which the molecules are aligned. Contrary to many conventional melt-processed liquid crystalline polymers, however, these polymers may nevertheless exhibit macroscopically isotropic mechanical properties.

Regardless of the particular constituents and nature of the polymer, the aromatic polyester may be prepared by initially introducing the aromatic monomer(s) used to form the ester repeating units (e.g., aromatic hydroxycarboxylic acid, aromatic dicarboxylic acid, etc.) and/or other repeating units (e.g., aromatic dial, aromatic amide, aromatic amine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616, 680 to Linstid, III, et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

The biphenyl precursor monomer (e.g., biphenyl alcohol, acid, amine, amide, etc.) may also be added to the polymerization apparatus. Although it may be introduced at any time, it is typically desired to apply the biphenyl monomer before melt polymerization has been initiated, and typically in conjunction with the other aromatic precursor monomers for the polymer. The relative amount of the biphenyl monomer added to the reaction mixture may be selected to help achieve a balance between solubility and mechanical properties as described above. In most embodiments, for example, biphenyl monomer(s) constitute from about 0.1 wt. % to about 30 wt %, in some embodiments from about 0.5 wt. % to about 25 wt. %, and in some embodiments, from about 1 wt. % to about 20 wt. % of the reaction mixture.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 210° C. to about 400° C., and in some embodiments, from about 250° C. to about 350° C. For instance, one suitable technique for forming the aromatic polyester may include charging precursor monomers and acetic anhydride into the reactor, heating the mixture to a temperature of from about 90° C. to about 150° C. to acetylize a hydroxyl group of the monomers (e.g., forming acetoxy), and then increasing the temperature to a temperature of from about 210° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. The resin may also be in the form of a strand, granule, or powder. While unnecessary, it should also be understood that a subsequent solid phase polymerization may be conducted to further increase molecular weight. When carrying out solid-phase polymerization on a polymer obtained by melt polymerization, it is typically desired to select a method in which the polymer obtained by melt polymerization is solidified and then pulverized to form a powdery or flake-like polymer, followed by performing solid polymerization method, such as a heat treatment in a temperature range of 200° C. to 350° C. under an inert atmosphere (e.g., nitrogen).

Regardless of the particular method employed, the resulting aromatic polyester may have a relatively high melting temperature. For example, the melting temperature of the polymer may be from about 250° C. to about 385° C., in some embodiments from about 280° C. to about 380° C., in some embodiments from about 290° C. to about 360° C., and in some embodiments, from about 300° C. to about 350° C. In some cases, however, the polymer may not exhibit a distinct melting temperature. The polymer may also have a relatively high melt viscosity, such as about 20 Pa-s or more, in some embodiments about 50 Pa-s or more, and in some embodiments, from about 750 to about 500 Pa-s, as determined at a shear rate of 1000 seconds$^{-1}$ and temperatures at least 20° C. above the melting temperature (e.g., 320° C. or 350° C.) in accordance with ISO Test No. 11443 (equivalent to ASTM Test No. 1238-70). Further, the polymer typically has a number average molecular weight ($M_n$) of about 2,000 grams per mole or more, in some embodiments from about 4,000 grams per mole or more, and in some embodiments, from about 5,000 to about 50,000 grams per mole. Of course, it is also possible to form polymers having a lower molecular weight, such as less than about 2,000 grams per mole, using the method of the present invention. The intrinsic viscosity of the polymer, which is generally proportional to molecular weight, may also be relatively high. For example, the intrinsic viscosity may be about 1 deciliters per gram ("dL/g") or more, in some embodiments about 2 dL/g or more, in some embodiments from about 3 to about 20 dL/g, and in some embodiments from about 4 to about 15 dL/g. Intrinsic viscosity may be determined in accordance with ISO-1628-5 using a 50/50 (v/v) mixture of pentafluorophenol and hexafluoroisopropanol, as described in more detail below.

The polymer, as well as compositions containing the polymer, may also exhibit good electrical properties. For instance, the polymer and/or polymer composition may have a relatively low dielectric constant that allows it to be employed as a heat dissipating material in various electronic applications (e.g., flexible printed circuit boards). For example, the average dielectric constant may be about 5.0 or less, in some embodiments from about 0.1 to about 4.5, and in some embodiments, from about 0.2 to about 3.5, as determined by the split post resonator method at a variety of frequencies, such as from about 1 to about 15 GHz (e.g., 1, 2, or 10 GHz). The dissipation factor, a measure of the loss rate of energy, may also be relatively low, such as about 0.0060 or less, in some embodiments about 0.0050 or less, and in some embodiments, from about 0.0010 to about 0.0040, as determined by the split post resonator method at a variety of frequencies, such as from about 1 to about 15 GHz (e.g., 1, 2, or 10 GHz).

B. Other Additives

If desired, the polymer composition may also employ one or more additives in conjunction with the aromatic polyester. Examples of such additives may include, for instance, viscosity modifiers, antimicrobials, pigments, antioxidants, stabilizers, surfactants, waxes, flow promoters, solid solvents, inorganic and organic fillers, and other materials added to enhance properties and processibility. For example, a filler material may be incorporated with the polymer composition to enhance strength. A filler composition can include a filler material such as a fibrous filler and/or a mineral filler and optionally one or more additional additives as are generally known in the art. Mineral fillers may, for instance, be employed in the polymer composition to help achieve the desired mechanical properties and/or appearance. When employed, mineral fillers typically constitute from about 5 wt. % to about 60 wt. %, in some embodiments from about 10 wt. % to about 55 wt. %, and in some embodiments, from about 20 wt. % to about 50 wt. % of the polymer composition.

Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2(Si,Al)_4O_{10}[(OH)_2,(H_2O)]$), montmorillonite ($(Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite (($Mg,Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable fillers may include boron nitride, calcium silicate, aluminum silicate, mica, diatomaceous earth, wollastonite, alumina, silica, titanium dioxide, calcium carbonate, and so forth. Mica, for instance, may be particularly suitable. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc., as well as combinations thereof. Nano-sized inorganic filler particles (e.g., diameter of about 100 nanometers or less) may also be employed in certain embodiments to help improve the flow properties of the composition. Examples of such particles may include, for instance, nanoclays, nanosilica, nanoalumina, etc. In yet another embodiment, inorganic hollow spheres (e.g., hollow glass spheres) may also be employed in the composition to help decrease the dielectric constant of the composition for certain applications.

Fibers may also be employed as a filler material to further improve the mechanical properties. Such fibers generally have a high degree of tensile strength relative to their mass. For example, the ultimate tensile strength of the fibers (determined in accordance with ASTM D2101) is typically from about 1,000 to about 15,000 Megapascals ("MPa"), in some embodiments from about 2,000 MPa to about 10,000 MPa, and in some embodiments, from about 3,000 MPa to about 6,000 MPa. To help maintain an insulating property, which is often desirable for use in electronic components, the high strength fibers may be formed from materials that are also generally insulating in nature, such as glass, ceramics (e.g., alumina or silica), aramids (e.g., Kevlar® marketed by E. I. Du Pont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof. When employed, fibrous fillers typically constitute from about 5 wt. % to about 60 wt. %, in some embodiments from about 10 wt. % to about 55 wt. %, and in some embodiments, from about 20 wt. % to about 50 wt. % of the polymer composition.

II. Solutions

As indicated above, the aromatic polyester is generally soluble in a wide variety of solvents and can thus be employed to form solutions. Suitable solvents may include, for instance, aprotic solvents, protic solvents, as well as mixtures thereof. Examples of aprotic solvents may include halogen-containing solvents, such as methylene chloride, 1-chlorobutane, chlorobenzene, 1,1-dichloroethane, 1,2-dichloroethane, chloroform, and 1,1,2,2-tetrachloroethane; ether solvents, such as diethyl ether, tetrahydrofuran, and 1,4-dioxane; ketone solvents, such as acetone and cyclohexanone; ester solvents, such as ethyl acetate; lactone solvents, such as butyrolactone; carbonate solvents, such as ethylene carbonate and propylene carbonate; amine solvents, such as triethylamine and pyridine; nitrile solvents, such as acetonitrile and succinonitrile; amide solvents, such as N,N'-dimethylformamide, N,N'-dimethylacetamide, tetramethylurea and N-methylpyrrolidone; nitro-containing solvents, such as nitromethane and nitrobenzene; sulfide solvents, such as dimethylsulfoxide and sulfolane; and so forth. Among the above-listed aprotic solvents, amide solvents (e.g., N-methylpyrrolidone) are particularly suitable. Suitable protic solvents may likewise include, for instance, solvents having a phenolic hydroxyl group, such as phenolic compounds substituted with at least one halogen atom (e.g., fluorine or chlorine). Examples of such compounds include pentafluorophenol, tetrafluorophenol, o-chlorophenol, trichlorobenzene, and p-chlorophenol. Mixtures of various aprotic and/or protic solvents may also be employed.

Regardless of the solvents selected, the resulting solution typically contains solvents in an amount of from about 60 wt. % to about 99 wt. %, in some embodiments from about 70 wt. % to about 98 wt. %, and in some embodiments, from about 75 wt. % to about 95 wt. %. Likewise, the polymer composition of the present invention may constitute from about 1 wt. % to about 40 wt. %, in some embodiments from about 2 wt. % to about 30 wt. %, and in some embodiments, from about 5 wt. % to about 25 wt. % of the solution. The "solubility" of the polymer composition may likewise constitute from about 1% to about 50%, in some embodiments from about 2% to about 40%, and in some embodiments, from about 5% to about 30%. As discussed in more detail below, the "solubility" for a given polymer composition is calculated by dividing the maximum weight of the polymer composition that can be added to a solvent without any visible macroscopic phase separation by the weight of the solvent, and then multiplying this value by 100. The resulting solution typically has a solution viscosity within the range of from about 1,000 to about 100,000 centipoise, in some embodiments from about 2,000 to about 50,000 centipoise, and in some embodiments, from about 5,000 to about 20,000 centipoise, as determined at a temperature of 22° C. using a Brookfield viscometer (spindle #63 and speed of 3 rpm).

To help increase the ability of the polymer composition to be dispersed in solution, it may be formed into a powder in certain embodiments of the present invention using a variety of different powder formation techniques. Examples of such powder formation techniques may include wet techniques (e.g., solvent evaporation, spray drying, etc.), dry techniques (e.g., grinding, granulation, etc.), and so forth. In one particular embodiment, for example, the polymer composition may be ground using a jaw crusher, gyratory crusher, cone crusher, roll crusher, impact crusher, hammer crusher, cracking cutter, rod mill, ball mill, vibration rod mill, vibration ball mill, pan mill, roller mill, impact mill, discoid mill, stirring grinding mill, fluid energy mill, jet mill, etc. Jet milling, for instance, typically involves the use of a shear or pulverizing machine in which the polymer composition is accelerated by gas flows and pulverized by collision. Any type of jet mill design may be employed, such as double counterflow (opposing jet) and spiral (pancake) fluid energy mills. Gas and particle flow may simply be in a spiral fashion, or more intricate in flow pattern, but essentially particles collide against each other or against a collision surface. In certain embodiments, it may be desired to mill the polymer composition in the presence of a cryogenic fluid (e.g., dry ice, liquid carbon dioxide, liquid argon, liquid nitrogen, etc.) to produce a low-temperature environment in the system. The low-temperature environment chills the polymer composition below its glass transition point to facilitate grinding in a mill that applies impact or shear, such as a jet-mill.

The resulting powder generally contains microparticles formed from the polymer composition of the present invention. The mean size of the microparticles is generally from about 0.1 to about 200 micrometers, in some embodiments from about 0.1 to about 100 micrometers, in some embodiments from about 0.1 to about 40 micrometers, in some embodiments from about 0.2 to about 30 micrometers, in some embodiments from about 0.5 to about 20 micrometers, and in some embodiments, from about 1 to about 15 micrometers. As used herein, the mean size of a microparticle may refer to its mean length, width, and/or height, and can be determined by optical microscopy as the average size of diameters measured at 2 degree intervals passing through a particle's geometric center. The microparticles may also possess a relatively low "aspect ratio" (mean length and/or width divided by the mean height). For example, the aspect ratio of the microparticles may be from about 0.4 to about 2.0, in some embodiments from about 0.5 to about 1.5, and in some embodiments, from about 0.8 to about 1.2 (e.g., about 1). In one embodiment, for example, the microparticles may have a shape that is generally spherical in nature. Regardless of the actual size and shape, however, the size distribution of the microparticles may be generally consistent throughout the powder. That is, at least about 50% by volume of the microparticles, in some embodiments at least about 70% by volume of the microparticles, and in some embodiments, at least about 90% by volume of the microparticles (e.g., 100% by volume) may have a mean size within a range of from about 0.1 to about 200 micrometers, in some embodiments from about 0.2 to about 150 micrometers, in some embodiments from about 0.5 to about 100 micrometers, and in some embodiments, from about 1 to about 50 micrometers.

III. Applications

Once formed, the resulting solution may be used alone or applied to a substrate to form a laminate. Any known technique for applying the solution to a substrate can generally be employed in the present invention. Some suitable liquid deposition techniques may include, for instance, casting, roller coating, dip coating, spray coating, spinner coating, curtain coating, slot coating, screen printing, bar coating methods etc. The material and size of the substrate to which the solution is applied may generally vary depending on the intended application. For example, the substrate may be formed from a metal (e.g., copper), plastic, ceramic, etc. Likewise, in certain embodiments, the substrate may have a foil-like structure in that it is relatively thin, such as having a thickness of about 500 micrometers or less, in some embodiments about 200 micrometers or less, and in some embodiments, from about 1 to about 100 micrometers. Of course, higher thicknesses may also be employed.

In certain embodiments of the present invention, the solution may be deposited onto the substrate in the form of a film. The thickness of the film may vary, but is typically about 1 millimeter or less, in some embodiments from about 0.5 to about 500 micrometers, in some embodiments from about 1 to about 100 micrometers, and in some embodiments, from about 2 to about 20 micrometers. In one particular embodiment, such a film can be obtained by casting the solution onto a substrate and thereafter removing the solvent(s). If desired, the solution may be filtered to remove contaminants prior to casting. The solvent(s) can likewise be removed through a variety of different methods, such as by heating, pressure reduction, ventilation, etc. In one particular embodiment, the solvent(s) are vaporized under ventilation. The vaporization may occur in one or multiple steps. For examples, a drying step may initially be employed at a temperature of from about 50° C. to about 200° C. for about 10 minutes to about 2 hours, and thereafter a heat treatment step may be employed at a temperature from about 200° C. to about 450° C. for about 30 minutes to about 6 hours.

Once the film is formed, it may remain on the substrate or be removed therefrom (e.g., peeled away) for use in various different applications. For example, the film or laminate can be employed in claddings, multi-layer print wiring boards for semiconductor package and mother boards, flexible printed circuit board, tape automated bonding, tag tape, packaging for microwave oven, shields for electromagnetic waves, probe cables, communication equipment circuits, etc. In one particular embodiment, a laminate is employed in a flexible printed circuit board that contains a conductive layer and an insulating film formed as described herein. The conductive layer may be in the form of a metal plate or foil, such as those containing gold, silver, copper, nickel, aluminum, etc. (e.g., copper foil). The film may be applied to the conductive layer using techniques such as described above (e.g., casting), or the conductive layer may alternatively be applied to the film using techniques such as ion beam sputtering, high frequency sputtering, direct current magnetron sputtering, glow discharge, etc. If desired, the film may be subjected to a surface treatment on a side facing the conductive layer so that the adhesiveness between the film and conductive layer is improved. Examples of such surface treatments include, for instance, corona discharge treatment, UV irradiation treatment, plasma treatment, etc. One benefit of the present invention is that the film can exhibit excellent adhesion to a conductive layer. For example, the film may exhibit an adhesion index of about 3 or more, in some embodiments about 4 or more, and in some embodiments, from about 4.5 to 5, as determined in accordance with ASTM D3359-09e2 (Test Method B). Due to its good adhesion properties, the laminate may be free of an additional adhesive between the film and the conductive layer. Nevertheless, adhesives can be employed if so desired, such as epoxy, phenol, polyester, nitrile, acryl, polyimide, polyurethane resins, etc.

The resulting laminate may have a two-layer structure containing only the film and conductive layer. Alternatively, a multi-layered laminate may be formed, such as a three-layer structure in which conductive layers are placed on both sides of a film, a five-layer structure in which films and conductive layers are alternately stacked, and so forth. Regardless of the number of layers, various conventional processing steps may be employed to provide the laminate with sufficient strength. For example, the laminate may be pressed and/or subjected to heat treatment as is known in the art.

A variety of different techniques may be employed to form a printed circuit board from such a laminate structure. In one embodiment, for example, a photo-sensitive resist is initially disposed on the conductive layer and an etching step is thereafter performed to remove a portion of the conductive layer. The resist can then be removed to leave a plurality of conductive pathways that form a circuit. If desired, a cover film may be positioned over the circuit, which may also be formed from the polymer composition of the present invention. Regardless of how it is formed, the resulting printed circuit board can be employed in a variety of different electronic components. As an example, flexible printed circuit boards may be employed in desktop computers, cellular telephones, laptop computers, small portable computers (e.g., ultraportable computers, netbook computers, and tablet computers), wrist-watch devices, pendant devices, headphone and earpiece devices, media players with wireless communications capabilities, handheld computers (also sometimes called personal digital assistants), remote controllers, global positioning system (GPS) devices, handheld gaming devices, etc. Of course, the polymer composition may also be employed in electronic components, such as described above, in devices other than printed circuit boards. For example, the polymer composition may be used to form high density magnetic tapes, wire covering materials, etc. Other types of articles, such as molded articles (e.g., containers, bottles, cookware, etc.), may also be fOrmed using the polymer composition of the present invention.

The present invention may be better understood with reference to the following examples.

Test Methods

Melt Viscosity: The melt viscosity (Pa-s) may be determined in accordance with ISO Test No. 11443 at 320° C. or 350° C. and at a shear rate of 400 s$^{-1}$ or 1000 s$^{-1}$ using a Dynisco 7001 capillary rheometer. The rheometer orifice (die) had a diameter of 1 mm, length of 20 mm, L/D ratio of 20.1, and an entrance angle of 180°. The diameter of the barrel was 9.55 mm±0.005 mm and the length of the rod was 233.4 mm.

Intrinsic Viscosity: The intrinsic viscosity ("IV") may be measured in accordance with ISO-1628-5 using a 50/50 (v/v) mixture of pentafluorophenol and hexafluoroisopropanol. Each sample was prepared in duplicate by weighing about 0.02 grams into a 22 mL vial. 10 mL of pentafluorophenol ("PFP") was added to each vial and the solvent. The vials were placed in a heating block set to 80° C. overnight. The following day 10 mL of hexafluoroisopropanol ("HFIP") was added to each vial. The final polymer concentration of each sample was about 0.1%. The samples were allowed to cool to room temperature and analyzed using a PolyVisc automatic viscometer.

Solubility: The solubility of a polymer can be determined by adding a predetermined amount of a polymer sample to a solution containing a predetermined amount of a solvent (e.g., N-methylpyrrolidone) and heating the resulting mixture from 150° C. to 180° C. for 3 hours. The mixture is considered soluble if it forms a clear to stable dispersion that does not undergo phase separation or separate into two layers upon standing at room temperature for a period of seven (7) days. If the mixture is determined to be soluble, additional amounts of the polymer sample are tested to determine the maximum amount of polymer that can be dissolved into the solvent. Likewise, if the mixture is determined to be insoluble, lower amounts of the polymer sample are tested.

The "solubility" for a given polymer is calculated by dividing the maximum weight of the polymer that can be added to a solvent without phase separation by the weight of the solvent, and then multiplying this value by 100.

Scanning Election Microscopy ("SEM"): The coated surfaces are examined by an SEM microscope (JSM 6360LV) at a 1.6 kv voltage.

Fourier Transform Infrared Microscopy ("FT-IR"): The coated surfaces are analyzed by a FT-IR microscope (Bio-rad, UMA-500) in the reflection mode (microATR, 30 degree Ge crystal, 100 scans, and 4 cm$^{-1}$ resolution).

Solution Viscosity: The solution viscosity is measured at 22° C. using a Brookfield viscometer (Model: LVDV-II+Pro, spindle #63). Viscosity measurements are taken at spindle speeds of 0.3 to 12 rpm until reaching the maximum capacity of the spring.

Adhesion Index: The adhesion properties of a coating are tested in accordance with ASTM D3359-09e2 (Test Method B). The adhesion index is measured on a scale from 0 to 5, with 0 representing the highest degree of adhesion and 5 representing the lowest degree of adhesion. That is, when a tape is peeled away from the coating during testing, an index of 0 means that greater than 65% of the coating was removed, an index of 1 means that 35-65% was removed, an index of 2 means that 15-35% was removed, an index of 3 means that 5-15% was removed, an index of 4 means that less than 5% was removed, and an index of 5 means that 0% was removed.

EXAMPLE 1

A 2 L flask is charged with HBA (248.6 g), HNA (338.7 g), TA (99.7 g), IA (99.7 g), 4-aminophenyl sulfone (298 g), and 51 mg of potassium acetate. The flask is equipped with C-shaped stirrer, thermal couple, gas inlet, and distillation head. The flask is placed under a low nitrogen purge and acetic anhydride (99.7% assay, 628.5 g) is added. The milky-white slurry is agitated at 75 rpm and heated to 140° C. over the course of 95 minutes using a fluidized sand bath. After this time, the mixture is gradually heated to 320° C. steadily over 350 minutes. Reflux is seen once the reaction exceeds 140° C. and the overhead temperature is increased to approximately 115° C. as acetic acid byproduct was removed from the system. During the heating, the mixture grows yellow and slightly more viscous and the vapor temperature gradually drops to 90° C. Once the mixture reaches 320° C., the nitrogen flow is stopped. The flask is evacuated under vacuum and the agitation is slowed to 30 rpm. As the time under vacuum progresses, the mixture grows viscous. The reaction is stopped by releasing the vacuum and stopping the heat flow to the reactor, when a predetermined torque reading is observed. The flask is cooled and the resulting polymer is recovered as a solid, dense yellow plug. Sample for analytical testing is obtained by mechanical size reduction. The melt viscosity of the sample at 320° C. is 103 Pa-s for a shear rate of 1000 s$^{-1}$ and 134.6 for a shear rate of 400 s$^{-1}$.

EXAMPLE 2

A 2 L flask is charged with HBA (310.8 g), HNA (141.1 g), IA (249.2 g), HQ (66.1 g), 4-hydroxyl phenyl sulfone (225.2 g), and 60 mg of potassium acetate. The flask is equipped with C-shaped stirrer, thermal couple, gas inlet, and distillation head. The flask is placed under a low nitrogen purge and acetic anhydride (99.7% assay, 628 g) is added. The milky-white slurry is agitated at 75 rpm and heated to 140° C. over the course of 95 minutes using a fluidized sand bath. After this time, the mixture is gradually heated to 320° C. steadily over 350 minutes. Reflux is seen once the reaction exceeds 140° C. and the overhead temperature is increased to approximately 115° C. as acetic acid byproduct was removed from the system. During the heating, the mixture grows yellow and slightly more viscous and the vapor temperature gradually drops to 90° C. Once the mixture reaches 320° C., the nitrogen flow is stopped. The flask is evacuated below 20 psi and the agitation is slowed to 30 rpm over the course of 45 minutes. As the time under vacuum progresses, the mixture grows viscous. After about 70 minutes, in the final vacuum step, a torque value of about 35 in/oz is recorded. The reaction is then stopped by releasing the vacuum and stopping the heat flow to the reactor. The flask is cooled and the resulting polymer is recovered as a solid, dense yellow-brown plug. Sample for analytical testing is obtained by mechanical size reduction. The melt viscosity of the sample at 370° C. is 77 Pa-s for a shear rate of 1000 s$^{-1}$ and 94 Pa-s for a shear rate of 400 s$^{-1}$.

EXAMPLE 3

A 2 L flask is charged with HBA (172.7 g), HNA (235.7 g), IA (207.7 g), APAP (75.6 g) and 4-hydroxyl phenyl sulfone (187.7 g). The flask is equipped with a C-shaped stirrer, thermal couple, gas inlet, and distillation head. The flask is placed under a low nitrogen purge and acetic anhydride (99.7% assay, 628.5 g) is added. The milky-white slurry is agitated at 75 rpm and heated to 140° C. over the course of 95 minutes using a fluidized sand bath. After this time, the mixture is then gradually heated to 320° C. steadily over 350 minutes. Reflux is seen once the reaction exceeds 140° C. and the overhead temperature increases to approximately 115° C. as acetic acid byproduct is removed from the system. During the heating, the mixture grows yellow and slightly more viscous and the vapor temperature gradually drops to 90° C. Once the mixture has reached 320° C., the nitrogen flow is stopped. The flask is evacuated below 20 psi and the agitation slows to 30 rpm over the course of 45 minutes. As the time under vacuum progresses, the mixture grows viscous. After about 30 minutes, in the final vacuum step, a torque value of about 25 in/oz is recorded. The reaction is then stopped by releasing the vacuum and stopping the heat flow to the reactor. The flask is cooled and the resulting polymer is recovered as a solid, dense yellow-brown plug. Sample for analytical testing is obtained by mechanical size reduction. The melt viscosity of the sample at 320° C. is 99 Pa-s for a shear rate of 1000 s$^{-1}$ and 145 Pa-s for a shear rate of 400 s$^{-1}$.

EXAMPLE 4

A 2 L flask is charged with HBA (241.7 g), IA (270 g), HQ (89.5 g) and 4-hydroxyl phenyl sulfone (203.3 g). The flask is equipped with a C-shaped stirrer, thermal couple, gas inlet, and distillation head. The flask is placed under a low nitrogen purge and acetic anhydride (99.7% assay, 524 g) is added. The milky-white slurry is agitated at 75 rpm and heated to 140° C. over the course of 95 minutes using a fluidized sand bath. After this time, the mixture is then gradually heated to 340° C. steadily over 280 minutes. Reflux is seen once the reaction exceeds 140° C. and the overhead temperature is increased to approximately 115° C. as acetic acid byproduct is removed from the system. During the heating, the mixture grows yellow and slightly more viscous and the vapor temperature gradually drops to 90° C. Once the mixture has reached 340° C., the nitrogen flow is stopped. The flask is evacuated below 20 psi and the agitation slows to 30 rpm over the course of 45 minutes. As the time under vacuum progresses, the mixture grows viscous. After about 15 minutes, in the final vacuum step, a torque value of about 1 in/oz is recorded. The reaction is then stopped by releasing the vacuum and stopping the heat flow to the reactor. The flask is cooled and the resulting polymer is recovered as a solid, dense yellow-brown plug. Sample for analytical testing is obtained by mechanical size reduction. The melt viscosity of the sample at 350° C. is 137 Pa-s (shear rate of 1000 s$^{-1}$) and 152 Pa-s (shear rate of 400 s$^{-1}$).

EXAMPLE 5

A 2 L flask is charged with HBA (241.7 g), IA (270 g), HQ (123.9 g) and 4-hydroxyl phenyl sulfone (123.9 g). The flask is equipped with a C-shaped stirrer, thermal couple, gas inlet, and distillation head. The flask is placed under a low nitrogen purge and acetic anhydride (99.7% assay, 524 g) is added. The milky-white slurry is agitated at 75 rpm and heated to 140° C. over the course of 95 minutes using a fluidized sand bath. After this time, the mixture is then gradually heated to 340° C. steadily over 280 minutes. Reflux is seen once the reaction exceeds 140° C. and the overhead temperature is increased to approximately 115° C. as acetic acid byproduct is removed from the system. During the heating, the mixture grows yellow and slightly more viscous and the vapor temperature gradually drops to 90° C. Once the mixture has reached 340° C., the nitrogen flow is stopped. The flask is evacuated below 20 psi and the agitation slows to 30 rpm over the course of 45 minutes. As the time under vacuum progresses, the mixture grows viscous. After about 40 minutes, in the final vacuum step, a torque value of about 40 in/oz is recorded. The reaction is then stopped by releasing the vacuum and stopping the heat flow to the reactor. The flask is cooled and the resulting polymer is recovered as a solid, dense yellow-brown plug. Sample for analytical testing is obtained by mechanical size reduction. The melt viscosity of the sample at 370° C. is 260 Pa-s (shear rate of 1000 s$^{-1}$) and 353 Pa-s (shear rate of 400 s$^{-1}$).

EXAMPLE 6

Figure 2:
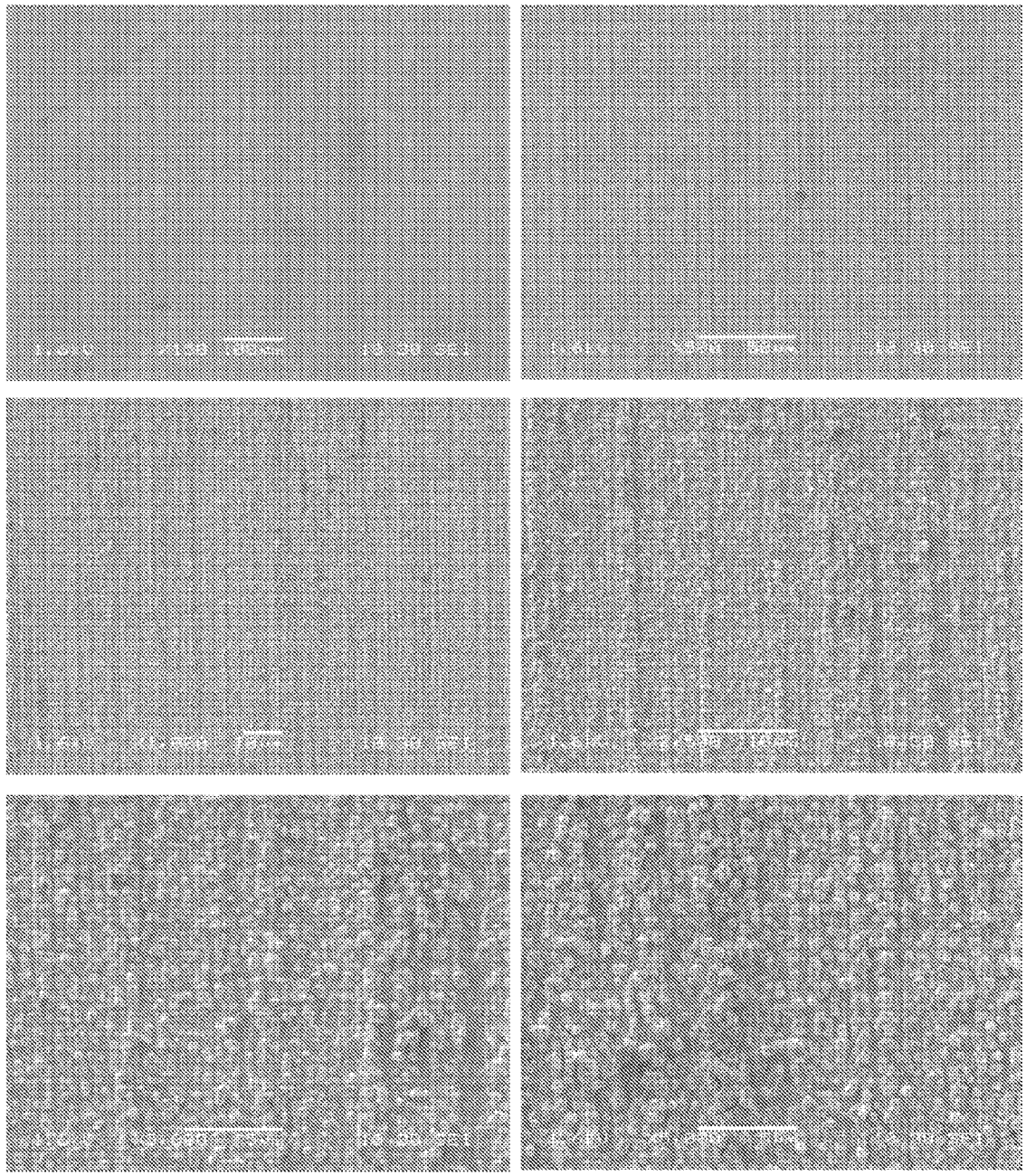
FIG. 2 illustrates SEM microphotographs of the roughened surface of the copper strip used in Example 6, determined at a 1.6 kv voltage and magnifications of 150×, 500×, 1,000×, 2,500×, and 5,000×.
Figure 3:
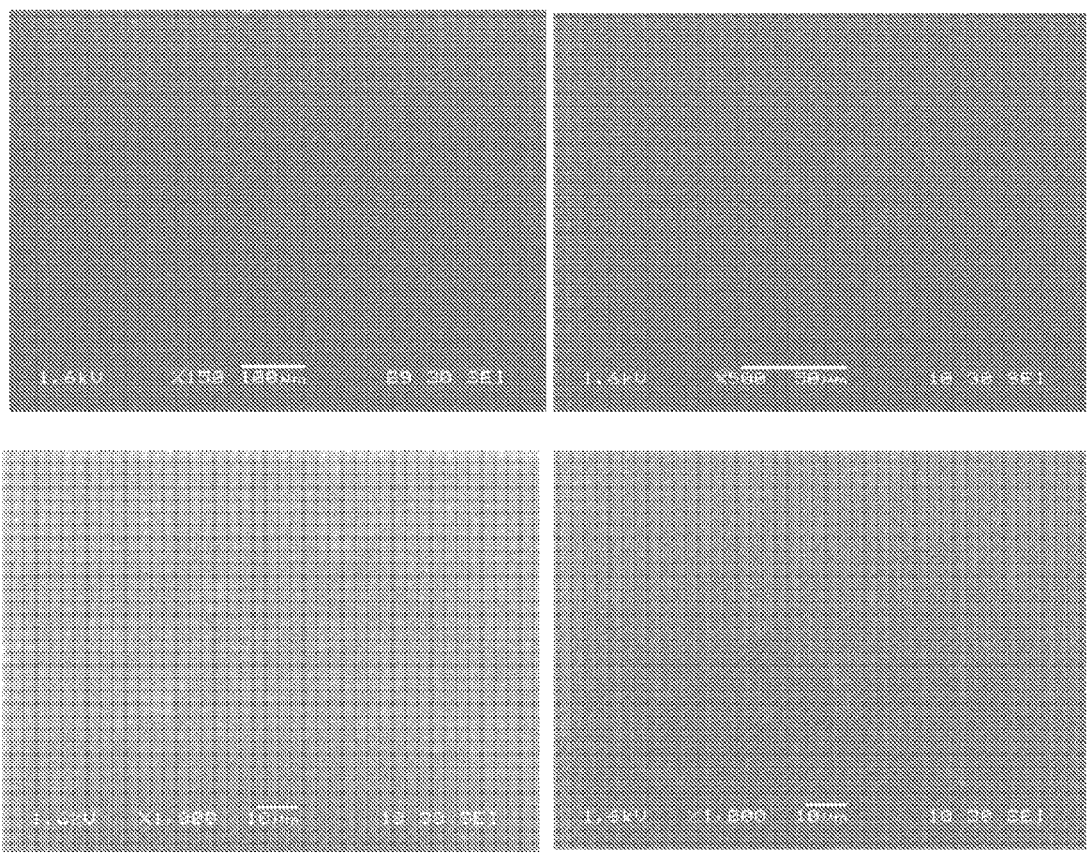
FIG. 3 illustrates SEM microphotographs of one of the polymer coated surfaces of Example 6, determined at a 1.6 kv voltage and magnifications of 150×, 500×, and 1,000×.
Figure 4:
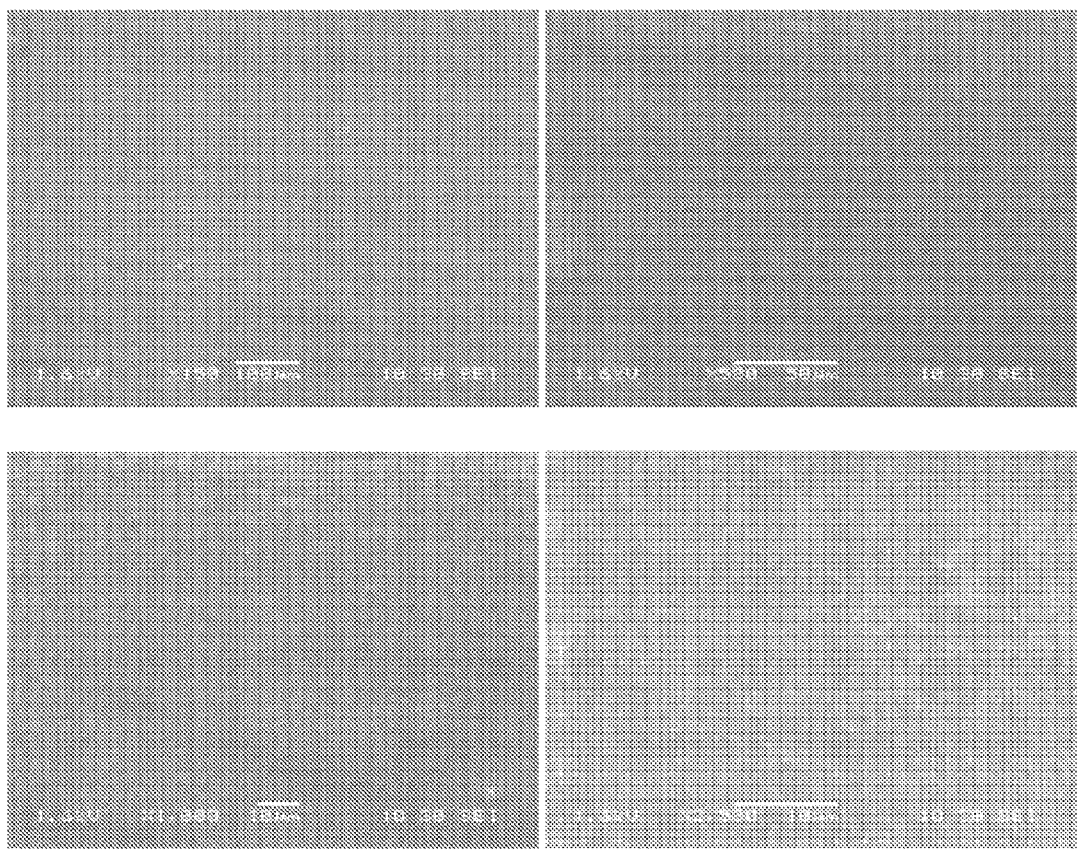
FIG. 4 illustrates SEM microphotographs of another of the polymer coated surfaces of Example 6, determined at a 1.6 kv voltage and magnifications of 150×, 500×, 1,000×, and 2,500×.
Figure 5:
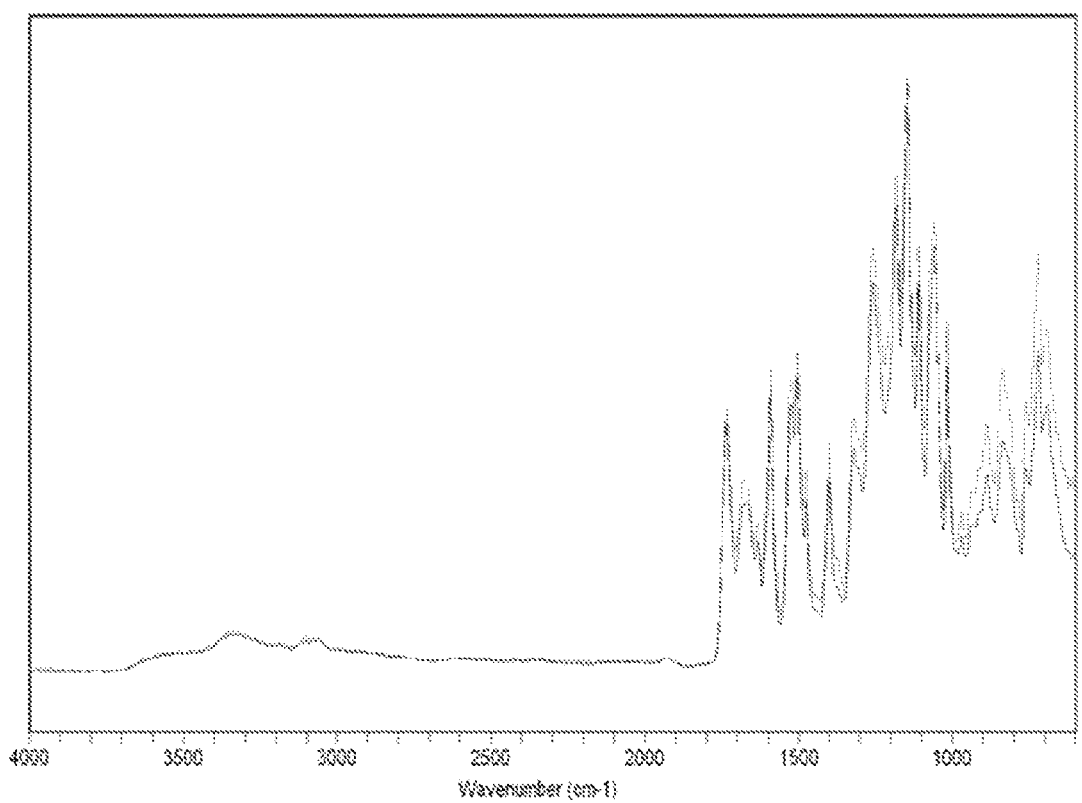
FIG. 5 shows the infrared spectra for the coating of Example 6.
Figure 6:
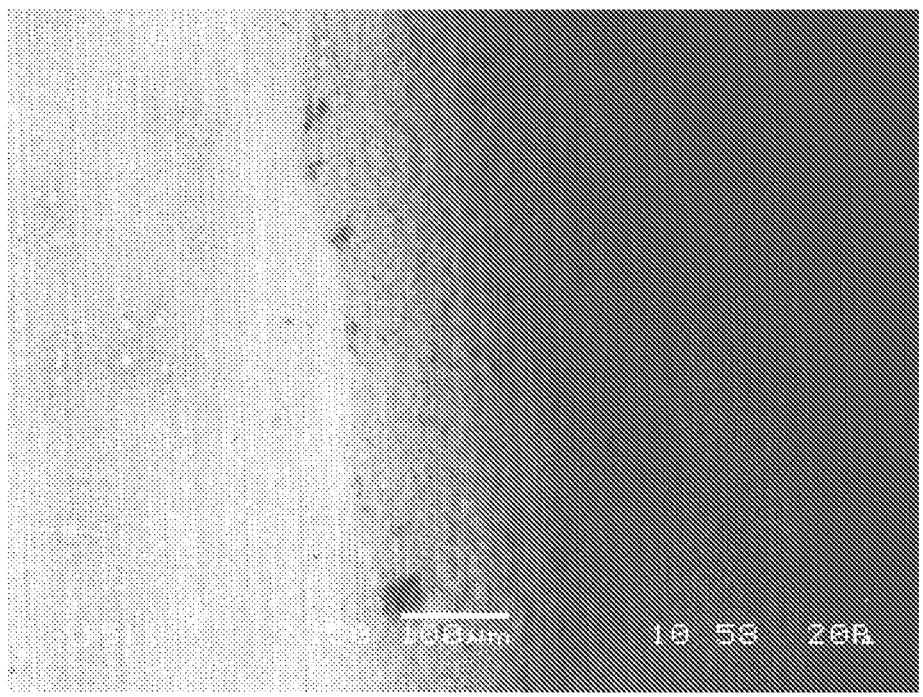
FIG. 6 illustrates an SEM microphotograph of the interface between the coating (darker) on one of the copper surfaces (brighter) of Example 6, determined at a 1.6 kv voltage and magnification of 150×.
Figure 7:
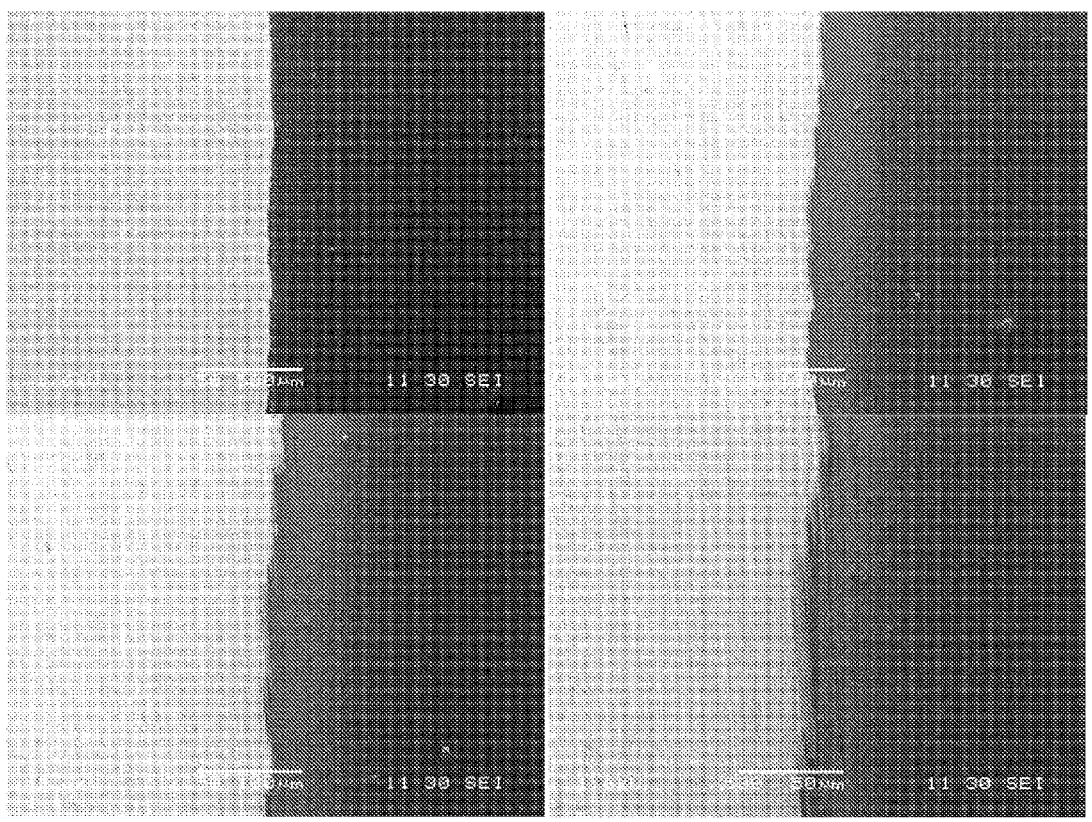
FIG. 7 illustrates SEM microphotographs of the interface between the Wang (darker) on another of the copper surfaces (brighter) of Example 6, determined at a 1.6 kv voltage and magnification of 50×, 150×, 250×, and 500×.

The ability to form a film on a copper strip is demonstrated. More particularly, the polymer of Example 1 is dissolved in N-methylpyrrolidone (NMP) at a concentration of 10 wt. %. A copper strip is provided that has one smooth surface and an opposing roughened surface formed via a copper deposit in an electrolyte. The surface morphology of the smooth copper surface of is shown in FIG. 1, while the roughened copper surface is shown in FIG. 2. To form the film, the copper strip is dipped slowly into the solution and then slowly raised. The coated copper strip is then placed in a vacuum oven at 150° C. overnight to eliminate any residual solvent. The coated surfaces are characterized via SEM microscopy, the results of which are shown in FIGS. 3-4. As indicated, the surface morphology for each of the coated surfaces appears to be smoother than the uncoated surfaces of the copper strip. The coated surfaces are also analyzed by FT-IR microscopy as described above, the results of which are shown in FIG. 5. Using this analysis, no organic solvent was observed in the infrared spectrum and the coated layer was determined to be the soluble polymer. The boundary between the coating and the copper strip is also observed using SEM microscopy. The results are shown in FIGS. 6-7. As indicated, a clear boundary exists between the coated and uncoated surfaces. The coating layers were also measured to be 15 pm and 5 pm for smooth and roughened copper surfaces, respectively.

EXAMPLE 7

The ability to form a film on a copper strip is demonstrated. More particularly, the polymer of Example 1 is dissolved in N-methylpyrrolidone (NMP) at a concentration of 10 wt %. The solution is applied to a copper sheet and drawn down with a bar film applicator (BYK 3 mil) to maintain a constant film thickness. The resulting cast film is dried at room temperature overnight, and then put in a convection oven at 200° C. overnight. The resulting film is tested for its dielectric constant and determined to be 2.5±0.5 at a frequency of 1 MHz-100 MHz (ASTM D 150). The dissipation factor was also less than 0.01.

EXAMPLE 8

45 grams of anhydrous NMP is initially heated at 180° C. in a 100 mL beaker in an oil bath with a magnetic stirrer. Gradually, a certain amount of the polymer of the Examples 1, 3, and 5 above are added to the solution to achieve the concentrations noted below. The solution is stirred and is thereafter allowed to equilibrate overnight at room temperature without stirring. Once formed, the viscosity is measured at 22° C. using the procedure described above. The results are set forth in the tables below

TABLE 1

Viscosity for Example 1 at 17 wt. %, 20 wt. %, 22.5 wt. %, and 25 wt. %

| Rpm | Viscosity (cP) | | | |
|-----|------|------|-------|------|
|     | 17%  | 20%  | 22.5% | 25%  |
| 0.6 | —    | —    | —     | 42,991 |
| 1.5 | —    | —    | —     | 15,117 |
| 3   | —    | —    | —     | 10,038 |
| 6   | —    | —    | —     | 7,800  |
| 12  | —    | 900  | 1300  | 6,300  |
| 30  | —    | 700  | 960   | —      |
| 60  | 120  | 585  | 759   | —      |
| 100 | 118  | 514  | 660   | —      |

TABLE 2

Viscosity for Example 3 at 18.2 wt. %

| Rpm | Viscosity (cP) at 18.2 wt. % |
|-----|-----|
| 30  | —   |
| 60  | 146 |
| 100 | 146 |

TABLE 3

Viscosity for Example 5 at 18.2 wt. %, 25 wt. %, and 30 wt. %

| Rpm | Viscosity (cP) | | |
|-----|-------|--------|--------|
|     | 18.2% | 25%    | 30%    |
| 0.3 | —     | 25,994 | 41,591 |
| 0.6 | —     | 18,796 | 29,794 |
| 1.5 | —     | 9,038  | 19,756 |
| 3   | —     | 6,919  | 14,077 |
| 6   | —     | 4,539  | 10,598 |
| 12  | —     | 3,619  | 7,558  |
| 30  | 172   | —      | —      |
| 60  | 170   | —      | —      |
| 100 | 178   | —      | —      |

EXAMPLE 9

The ability to form a film on copper and aluminum strips is demonstrated. More particularly, the polymers of Example 1, Example 3, and Example 5 are dissolved in N-methylpyrrolidone (NMP) at the concentrations noted below. The solutions are applied to a copper or aluminum sheet and drawn down with a bar film applicator to maintain a constant film thickness. The resulting cast film is dried at room temperature overnight, and then put in a convection oven at 200° C. overnight. The laminates are tested for adhesion index as set forth in the test method description above. The results are set forth below.

TABLE 4

Adhesion Index for Examples 1, 3, and 5

| | | Aluminum | | Copper | |
|---|---|---|---|---|---|
| Example | | Adhesion Index | Thickness (µm) | Adhesion Index | Thickness (µm) |
| 1 | 10.0% | 4.00 | — | — | — |
|   | 15.0% | 3.88 | — | — | — |
|   | 17.0% | 4.75 | — | — | — |
|   | 20.0% | 3.00 | — | — | — |
|   | 22.5% | 2.75 | — | — | — |
| 3 | 10.0% | 4.50 | 2.9 | — | — |
|   | 18.2% | 4.75 | 11.9 | — | — |
|   | 25.0% | 2.75 | — | — | — |
| 5 | 10.0% | 4.50 | 3.1 | — | — |
|   | 18.2% | 5.00 | 12.4 | 4.00 | 0.9 |
|   | 25.0% | 2.50 | — | — | — |
|   | 30.0% | 1.75 | — | 0.00 | — |

*Thickness values are obtained using SEM microscopy

EXAMPLE 10

The polymers of Examples 1, 3, and 5 are dissolved in N-methylpyrrolidone (NMP) at the concentrations noted below. The solutions are visually observed for solubility. If macroscopic phase separation is observed, "no" is recorded for the solubility determination. The results are set forth below.

| Concentration (%) | Example 1 | Example 3 | Example 5 |
|---|---|---|---|
| 10.0 | No  | No  | No |
| 17.0 | Yes | —   | —  |
| 18.2 | —   | Yes | No |
| 20.0 | Yes | —   | —  |
| 22.5 | Yes | —   | —  |
| 25.0 | Yes | —   | No |
| 30.0 | —   | —   | No |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An aromatic polyester comprising:
   i) from about 5 mol. % to about 50 mol. % of aromatic biphenyl repeating units having the following general Formula I:

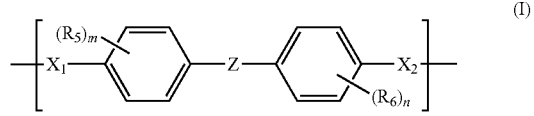

(I)

wherein,
$R_5$ and $R_6$ are independently halo, haloalkyl, alkyl, alkenyl, aryl, heteroaryl, cycloalkyl, or heterocyclyl;
m and n are independently from 0 to 4;
$X_1$ and $X_2$ are independently O, C(O), NH, C(O)HN, or NHC(O); and
Z is O or $SO_2$;

ii) from about 1 mol. % to about 70 mol. % of aromatic hydroxycarboxylic repeating units having the following general Formula II:

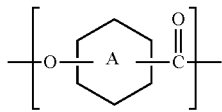

wherein, ring A is aryl; and iii) from about 5 mol. % to about 60 mol. % of aromatic dicarboxylic acid repeating units having the following general Formula III:

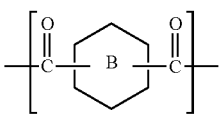

wherein, ring B is aryl;

wherein the total amount of repeating units in the aromatic polyester derived from naphthenic hydroxycarboxylic acids and/or naphthenic dicarboxylic acids is no more than about 60 mol. %.

2. The aromatic polyester of claim 1, wherein the total amount of repeating units in the aromatic polyester derived from naphthenic hydroxycarboxylic acids and/or naphthenic dicarboxylic acids is no more than about 35 mol. %.

3. The aromatic polyester of claim 1, wherein m and n Formula I are 0.

4. The aromatic polyester of claim 1, wherein $X_1$, $X_2$, or both are O or NH.

5. The aromatic polyester of claim 1, wherein Z is $SO_2$.

6. The aromatic polyester of claim 5, wherein the biphenyl repeating units are derived from 4-(4-hydroxyphenyl)-sulfonylphenol, 4-(4-aminophenyl)sulfonylphenol, 4-(4-aminophenyl)sulfonylaniline, or a combination thereof.

7. The aromatic polyester of claim 1, wherein Z is O.

8. The aromatic polyester of claim 7, wherein the biphenyl repeating units are derived from 4-(4-aminophenoxy)phenol, 4-(4-hydroxyphenoxy)-phenol, 4-(4-aminophenoxy)aniline, 4-(4-formylphenoxy)benzaldehyde, 4-(4-carbamoylphenoxy)benzamide, or a combination thereof.

9. The aromatic polyester of claim 1, wherein ring A and ring B are 1,4-phenylene.

10. The aromatic polyester of claim 1, wherein the aromatic dicarboxylic acid repeating units are derived from terephthalic acid, isophthalic acid, or a combination thereof and wherein the aromatic hydroxcarboxylic acid repeating units are derived from 4-hydroxybenzoic acid.

11. The aromatic polyester of claim 1, wherein the polyester further comprises one or more repeating units derived from an aromatic diol, aromatic amide, aromatic amine, or a combination thereof.

12. The aromatic polyester of claim 1, wherein the polyester is wholly aromatic.

13. The aromatic polyester of claim 1, wherein the polyester has a melting temperature of from about 250° C. to about 385° C.

14. A powder comprising a plurality of microparticles formed from the aromatic polyester of claim 1, wherein the microparticles have a mean size of from about 0.1 to about 200 micrometers and wherein at least about 50% by volume of the microparticles have a size within a range of from about 0.1 to about 200 micrometers.

15. A solution comprising the aromatic polyester of claim 1, wherein the solution comprises one or more solvents in an amount of from about 60 wt. % to about 99 wt. % and the polymer composition in an amount of from about 1 wt. % to about 40 wt. %.

16. The solution of claim 15, wherein the solution has a solution viscosity within the range of from about 1,000 to about 100,000 centipoise, as determined at a temperature of 22° C. using a Brookfield viscometer (spindle #63 and speed of 3 rpm).

17. A film having a thickness of about 1 millimeter or less, wherein the film comprises the aromatic polyester of claim 1.

18. A laminate comprising a substrate laminated to the film of claim 17.

19. The laminate of claim 18, wherein the substrate is a conductive layer.

20. A flexible printed circuit board comprising the laminate of claim 18.

* * * * *